Mar. 6, 1923.
F. C. ALUMBAUGH
MACHINE FOR MAKING DOUGHNUTS
Filed Oct. 20, 1920
1,447,166
2 sheets-sheet 1
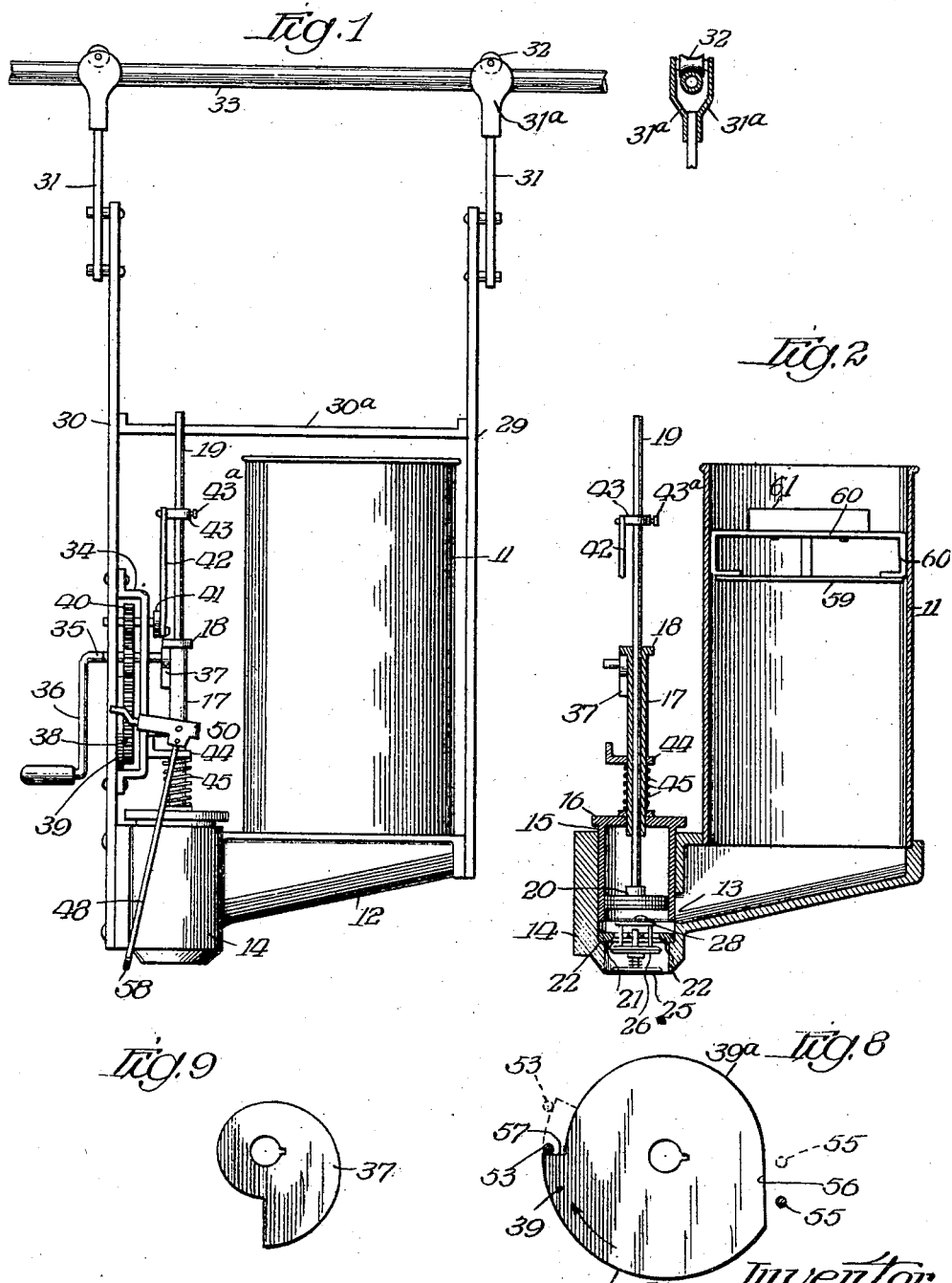

Mar. 6, 1923.
F. C. ALUMBAUGH
MACHINE FOR MAKING DOUGHNUTS
Filed Oct. 20, 1920   2 sheets-sheet 2
1,447,166
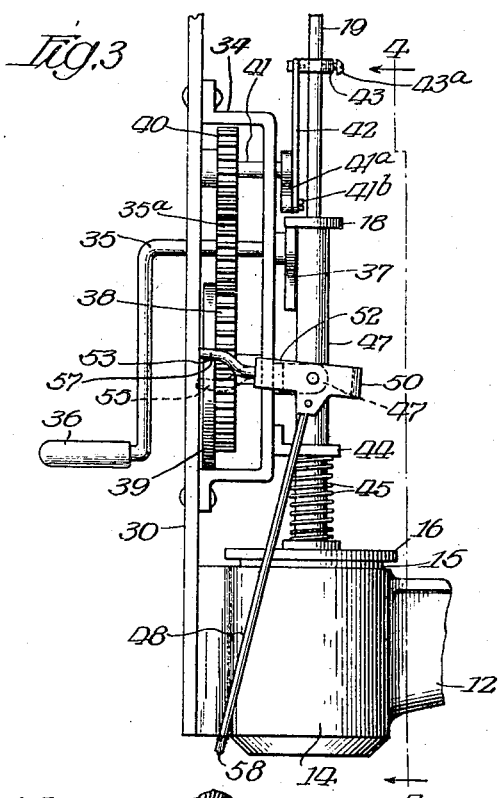
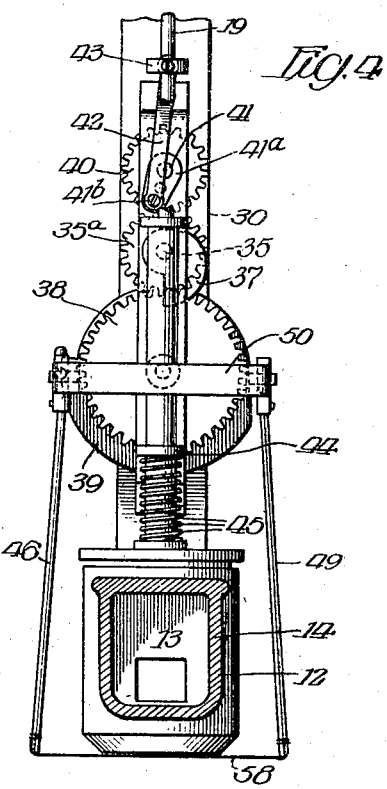
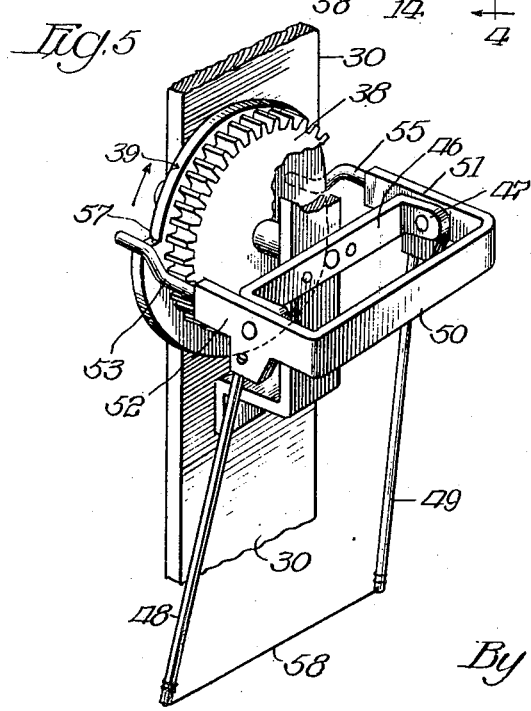
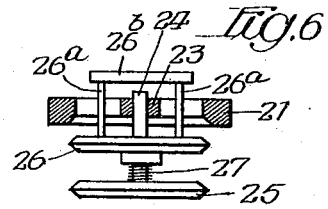
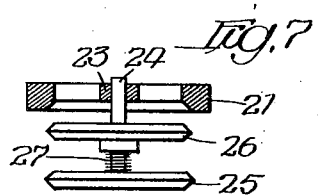
Inventor:
Frank C. Alumbaugh
By Rector, Hibben, Davis & Macauley
his Attys Patented Mar. 6, 1923.

1,447,166

UNITED STATES PATENT OFFICE.

FRANK C. ALUMBAUGH, OF ST. JOSEPH, MISSOURI, ASSIGNOR, BY MESNE ASSIGNMENTS, TO ACE DOUGHNUT MACHINE COMPANY, OF SPRINGFIELD, ILLINOIS, A CORPORATION OF ILLINOIS.

MACHINE FOR MAKING DOUGHNUTS.

Application filed October 20, 1920. Serial No. 418,149.

*To all whom it may concern:*

Be it known that I, FRANK C. ALUMBAUGH, a citizen of the United States, residing at St. Joseph, in the county of Buchanan and State of Missouri, have invented certain new and useful Improvements in Machines for Making Doughnuts, of which the following is a specification.

My invention relates to a machine for making doughnuts, and has as its general purpose the production of a simple, durable and efficient machine, operable by hand and suitable for use in bakeries and other establishments where it is desired to rapidly produce a considerable quantity of doughnuts, and which by reason of its adaptation to the ends in view shall be more desirable than any machines intended for the same purpose that are known to me. In carrying out my invention I have had in view the provision of a simple and efficient reciprocating mechanism for drawing the dough from a supply hopper into the piston chamber of a forcing mechanism and then expelling it therefrom in the form of a sleeve; novel and efficient means for severing the doughnuts in the form of rings from the sleeve of dough formed by the forcing mechanism; and suitable operating connections for coordinating and controlling the movements of the various parts of the machine whereby they may be caused to operate with certainty and precision. With the foregoing and incidental objects and advantages in view, I have devised the novel doughnut machine illustrated in the accompanying drawings and hereinafter described in detail, my invention residing in the novel arrangement, organization and combination of cooperating parts recited in the appended claims, it being understood, however, that my invention is susceptible of modification and variation in the form and construction of various members and parts and in details of construction, and that I intend to embrace within the scope of my claims all equivalent elements and substitutes for the parts recited, so far as they fall within the principle and spirit of my invention.

In the drawings forming part of this specification, Fig. 1 is a side elevation of my novel doughnut machine; Fig. 2 is a vertical section of the same taken on a plane passing centrally through the dough container and the forcing chamber; Fig. 3 is a detail elevation of a portion of the machine, on a larger scale than Fig. 2; Fig. 4 is a view of the principal parts of the machine shown in Fig. 3, looking towards the left, as the parts are viewed in said last mentioned figure; Fig. 5 is a perspective of a cam-actuated oscillating cutting mechanism for severing the doughnuts; Fig. 6 is a central vertical section of a valve forming part of the dough-forcing mechanisms; Fig. 7 is a view of a modified form of such a valve; Fig. 8 is a face view of the cam for actuating the doughnut cutting mechanism; and Fig. 9 is a face view of a cam for actuating a cylindrical sleeve forming part of the dough-forcing mechanism.

The same letters of reference indicate the same parts in all the figures of the drawing.

My novel doughnut machine, first outlining briefly its general organization, comprises a dough or batter receptacle mounted in a supporting frame adapted to be shifted on an over head track, and associated mechanism for forming the doughnuts consisting of a reciprocating piston mounted in a reciprocating sleeve valve which is arranged in a cylinder communicating with the batter container, such piston being adapted to draw batter from said receptacle into the piston chamber and expel it therefrom in the form of a hollow sleeve; a swinging bail provided with a cutting wire arranged to sever rings of dough from the sleeve of dough expelled by the piston; and connections operated through a hand crank for operating the piston and bail and also the sleeve valve in which the piston is mounted.

Describing now more in detail the particular construction of the machine as illustrated in the drawings, and which embodies my invention in a practical and desirable form, the hopper for receiving the dough consists of a container 11 seated in an annular shoulder formed at the top of a base member 12. This member 12 is formed with a downwardly inclined bottom and communicates through a valve governed port or opening 13 with the interior of a cylinder 14, which latter may conveniently be formed integral with the member 12 and be made of any suitable metal. As shown most clearly in Fig. 1, the container base and piston are secured to the side members 29 and 30 of the supporting frame, these side members being connected by a cross bar 30ᵃ above the container 11. The upper ends of the frame members 29 and 30 are in the present instance attached to depending bars 31 to which are secured opposite bearing plates 31ª between which are pivoted rollers 32 arranged to engage the track rail 33, so that the machine may be moved thereon from place to place above one cooking kettle or another or moved out of the way after being used.

Slidingly mounted in the cylinder 14 is an inner cylinder or sleeve 15, the upper end of which is closed by a top 16 extending outwardly from the sleeve in the form of a peripheral flange. Secured to the top 16 of the sleeve and extending upwardly axially thereof is a tubular sleeve 17 to which is fixed at the upper end a collar 18. The sleeve 15 is reciprocated by mechanism which will later be described and serves as a valve to open and close the port 13 before mentioned, and also forms a piston chamber arranged to receive a piston 20 by means of which batter is drawn in through said port and expelled to form the doughnuts. The piston head 20 is provided with noncorrosive metal washers in the usual manner and is secured to a piston rod 19 which extends slidingly through the tubular stem of the sleeve 15.

As shown in Fig. 2, the cylinder 14 is formed, adjacent its lower end, with an internal annular shoulder 22 upon which is seated a ring 21 provided with a diametrical bridge piece or cross bar 23. Secured to the center of this cross-bar is a vertical stem 24 which carries at its lower end a circular disk or plate 25 rigidly secured thereto. This disk forms a core concentric with the cylindrical wall of the cylinder 14 surrounding it, and the lower surface of the disk and the lower edge of the cylinder opening lie in the same plane. Upon the stem 24 is mounted a disk valve 26, yieldingly pressed upwardly by a spiral spring 27 interposed between such valve and the disk 25, so as to normally seat against a valve seat formed on the under side of the ring 21 and close the opening therethrough.

In the form of my invention illustrated in Figs. 2 and 6 I have provided means for mechanically opening the disk valve 26 through movement of the sleeve 15. To this end the disk valve 26 is provided with upwardly extending pins 26ª upon which is rigidly mounted a disk 26ᵇ, and the sleeve 15 is provided with a wire or rod 28 secured at its opposite ends to opposite parts of the inner wall of such sleeve adjacent its lower end, so that when the sleeve shifts from upper to lower position the cross-rod 28 will strike the disk 26ᵇ and thus open the valve 26.

Rigidly secured to the frame member 30 is a vertically arranged U-shaped bracket 34, to the vertical, intermediate member of which is fixed a transversely arranged horizontal bearing bracket 46 having side members 47 which pivotally support the swinging cutting mechanism for severing at each stroke the lower portion of the sleeve of dough ejected from the cylinder to form a ring of it. This mechanism consists of a U-shaped rocking frame 50, the side members 51 and 52 of which are pivoted between the side members 47—47 of the bearing bracket 46. Secured to and extending downwardly from the members 51 and 52 are a pair of spring arms respectively numbered 48 and 49, the lower ends of which are adapted to be connected by a cutting wire 58. The wire may conveniently be secured to the arms by first wrapping the wire around each arm adjacent its end, then flexing the arms inwardly and passing the wire across the ends of the arms, as shown in Fig. 5 and releasing the arms so that their spring tension may be exerted on the wire to maintain it in taut condition.

Projecting outwardly from the side members 51 and 52 of the rocking frame 50 to the left, as viewed in Figs. 3 and 5, are two rods, numbered respectively 53 and 55. The rod 53 is bent upwardly a short distance and then horizontally, and the rod 55 is bent downwardly a short distance and then horizontally so that in effect the end portion of the rod 53 is offset upwardly, and the end portion of the rod 55 offset a like distance downwardly. These end portions of the rod are arranged to cooperate with a rotating cam 39, fixed to a shaft journaled in the frame member 30 and bracket member 34,—see Figs. 3, 5 and 8. Approximately one-half of this cam is formed upon a semicircle 39ª, and somewhat less than the remaining portion lies in the arc of a circle of greater radius, 39ᵇ, one end of the semicircular surface being separated by a shoulder 57 from the arcuate surface, and the other end of the semicircle being extended in a tangent 56 intersecting the arc,—see Fig. 8. It will readily be understood that when the spring arms 48 and 49 and the cutting wire are in extreme right hand position (opposite the position shown in Figs. 3 and 5) the end portions of the rods 53 and 55 will be in lowermost position, and as shown in Fig. 8 the end of the rod 53 will lie in position to be engaged by the shoulder 57 on the cam as it is rotated in the direction indicated by the arrow. The rod 53 is then lifted, moving in a vertical plane, until the shoulder clears the rod and passes under it (see the dotted lines in Fig. 8), after which the arcuate surface locks the rod and connected cutting members in the position shown in Figs. 1, 3 and 5. By this shifting of the oscillating structure the end of the rod 55 is lifted into position to be engaged by the shoulder 57 of the cam when it reaches a point diametrically opposite the point where it came into engagement with the rod 53,—see the change of position indicated in dotted lines in Fig. 8. The tangential cutting away of the cam opposite the shoulder 57 effects a release of the locked engagement above described, so as to permit the shoulder 57 to rock the cutting frame back and forth, as described.

The mechanisms above described are actuated by means of a manually operable crank 36, the shaft 35 of which is journaled in bearings in the frame member 30 and bracket 34. The inner end of this crank carries a cam 37 which is arranged to cooperate with the collar 18 upon the stem of the sleeve 15 to force the sleeve upwardly against the tension of a spiral spring 45 interposed between the top 16 of the sleeve and a stop lug 44 secured to the bracket member 34 of the frame. Fixed to the shaft 35 is a pinion 35ª meshing with a pinion 40 of the same size secured to a shaft 41 which at its inner end is provided with a crank 41ª. This crank is arranged to reciprocate the piston 20 through a pitman rod 42 which at its lower end is pivoted to the crank and at its upper end is pivoted to a bearing stud carried by a collar 43 adjustably secured by a set screw 43ª to the stem 19 of the piston. For the purpose of varying the throw of piston and thus varying the amount of dough extruded from the cylinder and consequently varying the size of the doughnuts, the pitman rod is adjustably connected to the crank 41ª. Any suitable means of adjustment may be provided, and in the present instance, as illustrated, I employ a headed bearing stud 41ᵇ having a threaded end adapted to be seated in either of two screw-threaded sockets formed in the crank 41ª at different distances from the axis of its rotation.

The cam 39 is rotated by means of a gear wheel 38 rigidly mounted with respect to said cam so as to rotate therewith and meshing with the pinion 35ª. This gear wheel has twice the number of teeth of the pinion 35ª, and therefore causes the cutting bail to swing once across from one side of the cylinder to the other side during each complete cycle of movement of the piston and sleeve valve.

In order to protect the top of the body of dough or batter in the container 11 from contamination by dust, insects, etc., and also to provide a pressure which will both tend to prevent the escape of leavening gases and assist the suction of the piston in carrying the dough from the container into the piston chamber, I have in the present instance provided a follower consisting of a snug-fitting disk 59 provided with guide members 60 to prevent it from twisting side wise, and weighted by a weight 61 as shown. It will be understood, however, that with batter of the usual and proper consistency, the unaided action of the piston will suffice to draw the dough into the piston chamber, and that the follower and pressure members may be omitted, an ordinary cover arranged to protect the contents of the receptacle without hermetically sealing it being preferably provided in such case.

The operation of my novel doughnut machine will be readily understood from the foregoing description of its construction. The construction and adjustment of the parts is such that at or immediately following the end of the forcing stroke of the piston the shoulder 57 of the cam 39 will come into contact either with the end of the rod 53 or the end of the rod 55, as the case may be, and during the period when the crank arm 41ª crosses dead center and the piston reaches the limit of its stroke and begins to rise, the cutting bail will be quickly carried across the lower end of the cylinder 14 to cut off a ring from the mass of dough which has just been extruded by the forcing stroke of the piston in the form of a sleeve between the cylinder wall and the core 25. The cutting mechanism will then become locked in stationary position while the piston is drawing a new charge of dough from the container 11 into the piston chamber.

In the meantime, while the piston was rising from lowermost position the cam 37 will have lifted the sleeve 15, thus opening the port 13, previously closed, and the disk valve 26 will have closed, the piston during its upward movement drawing in a charge of batter through said port 13. The sleeve 15 during such upward movement of the piston, will continue to rise until the shoulder of the cam disengages from the collar 18, when the spiral spring will immediately force down the sleeve, closing the opening 13 and trapping the dough drawn through such opening in the piston chamber. The piston now descends forcing out a charge of dough, and at the end of this stroke the cutting mechanism will be operated to swing the bail back across the cylinder opening in a direction opposite to the last preceding stroke.

With the form of valve shown in Fig. 6 the valve 26 will be quickly opened to its full extent by the downward movement of the sleeve 15, and will afterwards close only as fast as the sleeve 15 rises and permits it to do so, and in this closing movement a certain portion of the dough in the discharge passage of the cylinder will be drawn back from the mouth thereof and a part re-enter the piston chamber. Although this is of advantage with certain varieties of dough, it will be understood that with doughnut batter of the proper and usual consistency the form of valve shown in Fig. 7 may be used, this valve differing from the form shown in Fig. 6 only in the omission of the members 26ª and 26ᵇ, the cross rod 28 of the sleeve valve being of course also dispensed with.

While I have illustrated in the drawings and have above described a machine embodying my invention in a preferred form, it will be understood that other and different forms are possible, and that my invention is not limited to the specific construction described.

To the extent that the subject matter of the present application is disclosed in my copending application Serial No. 355,684, filed February 2, 1920, the present application is a continuation of said earlier application.

I claim:

1. A machine of the character described and comprising a hopper, a cylinder having a port communicating with said hopper, a sleeve in said cylinder arranged to reciprocate longitudinally to cover and uncover said port, a piston arranged to reciprocate in said sleeve, a circular core concentric with the lower end of the cylinder and flush with such end, an upwardly spring-pressed valve above said core arranged to close said cylinder below said port, and a cutter arranged to reciprocate adjacent the cylinder end and core.

2. A machine of the character described and comprising a hopper, a cylinder having a port communicating with said hopper, a sleeve in said cylinder arranged to reciprocate longitudinally to cover and uncover said port, a piston arranged to reciprocate in said sleeve, a circular core concentric with the lower end of the cylinder and flush with such end, an upwardly spring pressed valve above said core arranged to close said cylinder below said port, said sleeve being arranged to cooperate with said valve and open it upon reciprocating to uncover said port, and a cutter arranged to reciprocate adjacent the cylinder end and core.

3. A machine of the character described and according to claim 1 in which said core is formed as a disk fixed to a central stem depending from a bridge piece supported by the cylinder, and in which said spring-pressed valve is mounted on said stem.

4. In a machine of the character described the combination of a hopper, a cylinder having a port communicating with said hopper, a sleeve in said cylinder governing said port, said sleeve being provided with a tubular stem, a piston arranged to reciprocate in said sleeve and having a stem arranged within said tubular stem, and a train of operating connections including a crank arranged to reciprocate said piston and a cam arranged to reciprocate said sleeve.

5. In a machine of the character described, a combination of parts according to claim 4 in which the stem of said sleeve is equipped with a spring yieldingly tending to close said port.

6. In a machine of the character described and provided with a vertical cylinder, mechanism for forcing the dough through a discharge opening at the bottom of such cylinder, cutting mechanism comprising a frame pivoted on a horizontal axis and having depending arms arranged to straddle said cylinder, a cutting member carried by said arms and arranged to reciprocate adjacent said opening, and cam means for reciprocating said frame.

7. In a machine of the character described and provided with a vertical cylinder, mechanism for forcing the dough through a discharge opening at the bottom of such cylinder, cutting mechanism comprising a frame pivoted on a horizontal axis and having depending arms arranged to straddle said cylinder, and a pair of horizontally extending contact members, a cutting member carried by said depending arms and arranged to reciprocate adjacent said opening, and a cam arranged to cooperate with one of said contact members to swing the frame in one direction and with the other contact member to swing such frame in the opposite direction.

8. In a machine of the character described, cutting mechanism according to claim 7 in which said cam has a locking face adapted to retain said frame in each extreme position until ready to swing to the opposite position.

9. A machine of the character described and comprising a dough hopper, a cylinder communicating with said hopper and having a discharge opening at its bottom, a reciprocating piston arranged to force a charge of dough through said opening at each downward stroke, and a pivoted bail equipped with a cutting member arranged to swing in one direction adjacent said discharge opening after one downward stroke of the piston and swing in the opposite direction adjacent said opening after the succeeding downward piston stroke.

10. A machine of the character described and comprising a dough hopper, a cylinder communicating with said hopper and having a discharge opening at its bottom, a reciprocating piston arranged to force a charge of dough through said opening at each downward stroke, and an intermittently movable cutting member arranged to move across said opening at the end of each downward stroke of the piston and cut off the charge of dough forced out at such downward stroke.

11. In a machine of the character described, cutting means including a pivoted cutter support and a cutter member carried thereby, offset contact members projecting radially from the cutter support, and a rotating cam formed with a shoulder arranged to cooperate alternately with said contact members.

12. In a machine of the character described, cutting means including a pivoted cutter support and a cutter member carried thereby, offset contact members projecting radially from the cutter support, and a rotating cam formed with a shoulder arranged to cooperate alternately with said contact members, said cam being formed with a locking face arranged to retain said support and cutter in alternative extreme positions between the shifting movements of the cam and contact members.

13. A device of the class described, comprising a hopper, a cylinder communicating with the hopper, a sleeve slidably mounted in the cylinder for opening and closing communication between the hopper and cylinder, a tubular extension formed on the sleeve, a flange formed around the tubular extension, a piston slidably mounted in the sleeve and having a piston rod passing through the tubular extension, means adapted to engage the flange on the tubular extension for sliding the sleeve, and means connected to the piston rod for operating the piston.

14. A device of the class described, comprising a hopper, a cylinder communicating with the hopper, a sleeve slidably mounted in the cylinder for opening and closing communication between the hopper and cylinder, a tubular extension formed on the sleeve, a flange formed around the tubular extension, a piston slidably mounted in the sleeve and having a piston rod passing through the tubular extension, means adapted to engage the flange on the tubular extension for sliding the sleeve to open communication between the hopper and cylinder, means for automatically returning the sleeve to closed position, and means connected to the piston rod for operating the piston.

15. A device of the class described, comprising a hopper, a cylinder communicating with the hopper, a sleeve slidably mounted in the cylinder for opening and closing communication between the hopper and cylinder, a tubular extension formed on the sleeve, a flange formed around the tubular extension, a piston slidably mounted in the sleeve and having a piston rod passing through the tubular extension, means adapted to engage the flange on the tubular extension for sliding the sleeve to open communication between the hopper and cylinder, a spring surrounding the tubular extension and engaging the sleeve, for automatically returning the sleeve to closed position, and means connected to the piston rod for operating the piston.

16. A device of the class described, comprising a material receiving hopper, a cylinder communicating with the hopper, and adapted to receive material therefrom, said cylinder having a discharge opening at the lower end, a plate supported in the discharge opening, said plate being of less diameter than the opening, a valve for normally closing the discharge opening, and means for discharging the material from the cylinder around the plate.

17. A device of the class described, comprising a material receiving hopper, a cylinder communicating with the hopper, and adapted to receive material therefrom, said cylinder having a discharge opening at the lower end, a plate stationarily supported in the discharge opening, said plate being of less diameter than the opening, a disc valve for normally closing the discharge opening said valve being of the same diameter as and in perpendicular alignment with the plate, and means for discharging the material from the cylinder around the valve and plate.

18. A device of the class described comprising a hopper, a cylinder communicating with said hopper, means for opening and closing the communication between said hopper and said cylinder, means for creating a vacuum in said cylinder upon the establishing of said communication, an oscillatory cutting element, and means for oscillating said cutting element upon the closing of said communication between said hopper and said cylinder, substantially as described.

19. A device of the class described, comprising a hopper, a cylinder communicating with the hopper, a sleeve slidably mounted in the cylinder, means for operating the sleeve to open communication between the hopper and cylinder, separate means for automatically returning the sleeve to closed position, and a piston slidably mounted in the sleeve.

20. A device of the class described, comprising a material containing hopper, a cylinder communicating with the hopper and adapted to receive material therefrom, a valve normally closing one end of the cylinder, a sleeve slidably mounted in the cylinder for opening and closing communication between the hopper and cylinder, and a piston operable in the sleeve, the valve being opened by the operation of the sleeve to discharge the material from the cylinder.

FRANK C. ALUMBAUGH.